United States Patent [19]

Bucker

[11] Patent Number: 4,843,599
[45] Date of Patent: Jun. 27, 1989

[54] METHOD FOR CONTINUOUS COLOR MAPPING OF SEISMIC DATA

[75] Inventor: Rhoda H. Bucker, Tulsa, Okla.

[73] Assignee: Amoco Corporation, Chicago, Ill.

[21] Appl. No.: 101,915

[22] Filed: Sep. 28, 1987

[51] Int. Cl.$^4$ .......................... G01V 1/34; G09G 1/28
[52] U.S. Cl. ....................................... 367/70; 340/701
[58] Field of Search .................. 367/70, 110, 68, 72; 340/701, 703, 715; 346/33 C

[56] References Cited

U.S. PATENT DOCUMENTS

| | | | |
|---|---|---|---|
| 3,243,821 | 3/1966 | Bogs et al. | 367/70 |
| 3,662,325 | 5/1972 | Savit | 367/70 |
| 4,228,529 | 10/1980 | Hsu et al. | 367/70 |
| 4,279,026 | 7/1981 | Lambright et al. | 367/70 |
| 4,633,447 | 12/1986 | Bodine | 367/70 |
| 4,661,935 | 4/1987 | Shock et al. | 367/70 |

FOREIGN PATENT DOCUMENTS

| | | |
|---|---|---|
| 477363 | 10/1974 | Australia ........................ 367/70 |
| 0228069 | 7/1987 | European Pat. Off. . |
| 2164751 | 3/1986 | United Kingdom . |

OTHER PUBLICATIONS

"Continuous Color Choropleth Maps", by John L. Sibert, Gas Processing, 1(1980), pp. 207–216; Elsevier Scientific Publishing Company, Amsterdam.

*Primary Examiner*—Thomas H. Tarcza
*Assistant Examiner*—Ian J. Lobo
*Attorney, Agent, or Firm*—Timothy D. Stanley

[57] ABSTRACT

The present invention relates generally to a method for continuous color mapping of nonscalar data. Moreover, the method for continuous color mapping of non-scalar data comprises mapping both single-component and multicomponent nonscalar data whereby the single-component and multicomponent nonscalar data can be uniquely displayed separately or combined by chromatic vector addition and uniquely displayed concurrently. More partiuclarly, the present invention provides a method for producing separate, continuous color displays of seismic data as well as a method for combining multiple sets of seismic data, by vector chromatic addition, to uniquely display two or more sets of seismic data concurrently.

15 Claims, 14 Drawing Sheets

METHOD FOR CONTINUOUS COLOR MAPPING OF SEISMIC DATA

BACKGROUND OF THE INVENTION

The present invention relates generally to a method for continuous color mapping of nonscalar data. Moreover, the method for continuous color mapping of nonscalar data comprises mapping both single component and multicomponent nonscalar data whereby the single component and multicomponent nonscalar data can be uniquely displayed separately or combined, by chromatic vector addition, and uniquely displayed concurrently. More particularly, the present invention provides a method for producing separate continuous color displays of seismic data as well as a method for combining multiple sets of seismic data, by chromatic vector addition, to uniquely display two or more sets of seismic data concurrently.

Color mapping of data involves a series of transformations employing a color coordinate system. Most color mappings of scalar data are produced by varying shades of a selected color or by mixing selected combinations of primary colors (e.g., red, green and blue). Exemplary of a color coordinate system which employs such an approach is the RGB (red, green, and blue) Cartesian coordinate system where the three colors (red, green, and blue) define three color axes (R,G,B). In the RGB color coordinate system, each color has an intensity or saturation ranging from no color to maximum color (e.g., from 0 to 1) wherein the intensity or saturation of the selected color can be varied according to scaled values of the data to be displayed. As a result, separate sets of scalar data can be displayed employing the RGB color coordinate system shown in FIG. 1. By way of example, the following ordered (R,G,B) sets can produce an RGB color cube representing the following colors:

(0,0,0) = Black
(1,1,1) = White
(1,0,0) = Red
(0,1,0) = Green
(0,0,1) = Blue
(1,1,0) = Yellow
(0,1,1) = Cyan
(1,0,1) = Magenta (where 0 indicates absence of primary color; and 1 indicates presence of primary color).

Alternative color coordinate systems for transforming scalar data are also available and generally compromise variations of the HLS (hue, lightness, saturation) system. With the RGB system, as with any other color coordinate system, a simple transformation for displaying scalar data can be expressed by:

$$U_i = a + bx_i \quad (1)$$

where $U_i$ is a transform of the scalar data $x_i$, a is an offset to ensure a minimum value of $U_i = 0$, and b is a scaling factor such that $U_i$ has a maximum value of 1.

Unfortunately, real data sets are not always limited to scalar data sets or data sets for which it is informative to represent both positive and negative values as scalar data by use of an offset. Exemplary of such real data are seismic traces recorded during geophysical exploration which represent the earth's response to seismic energy imparted therein. Seismic traces represent one-dimensional data and are generally depicted in either the time-domain or frequency domain. Such seismic traces are complex sinusoids having both positive and negative values. To more accurately interpret such seismic traces, knowledge of more than scalar values is needed. The difficulty in categorizing both the positive and negative measures of seismic traces has resulted in color systems which generally assign colors only to positive values of the seismic trace. Such a coloring system is decidedly biased or aliased in its representation of the complete seismic trace. Other color transformation schemes, such as described by Shock, et al., in U.S. Pat. No. 4,661,935, have been proposed to more accurately portray seismic data. However, the Shock, et al., scheme neither provides a mechanism for uniquely displaying nonscalar data using less than four colors nor a mechanism for combining two or more separate sets of nonscalar data into a single display. The present invention provides a method for continuous color displays of both one-dimensional and multidimensional data sets which overcome the aforementioned limitations.

SUMMARY OF THE INVENTION

The present invention provides a novel method for continuous color mapping of non-scalar data. More particularly, the method for continuous color mapping of non-scalar data can be employed to uniquely display both single component and multicomponent nonscalar data. Additionally, the method of continuous color mapping provides for uniquely combining and displaying at least two components of the nonscalar data by chromatic vector addition.

In continuous color mapping of nonscalar data, a color coordinate system is established whereby the non-scalar data can be transformed into unique colors. A first one-dimensional color axis is established having a first spectrum of colors assigned to both positive and negative values of a first component of the nonscalar data. The colors of the first spectrum of colors assigned to positive values of the first component of the nonscalar data are complementary to the colors of the first spectrum of colors assigned to negative values of the first component of the nonscalar data. A second one-dimensional color axis is established having a second spectrum of colors assigned to both positive and negative values of a second component of the nonscalar data. The colors of the second spectrum colors assigned to positive values of the second component nonscalar data are complementary to the colors of the second spectrum of colors assigned to negative values of the second component of the nonscalar data. A third one-dimensional color axis is established having a third spectrum of colors assigned to both positive and negative values of a third component of the nonscalar data. The colors of the third spectrum colors assigned to positive values of the third component nonscalar data are complementary to the colors of the third spectrum of colors assigned to negative values of the third component of the nonscalar data.

In a first color coordinate system, the spectrum of colors of each color axis comprises complementary colors having varying saturations ranging from zero to a maximum. In a second color coordinate system, the spectrum of colors of each color axis comprises complementary color spectrums having colors varying according either body-diagonals or face-diagonals of a RGB color cube.

DETAILED DESCRIPTION OF THE PREFERRED EMBODIMENTS

The present invention relates generally to a method for continuous color mapping of nonscalar data. More particularly, the present invention provides a unique method for continuous color mapping of sets of seismic trace data either singularly or in combination.

Figure 1:
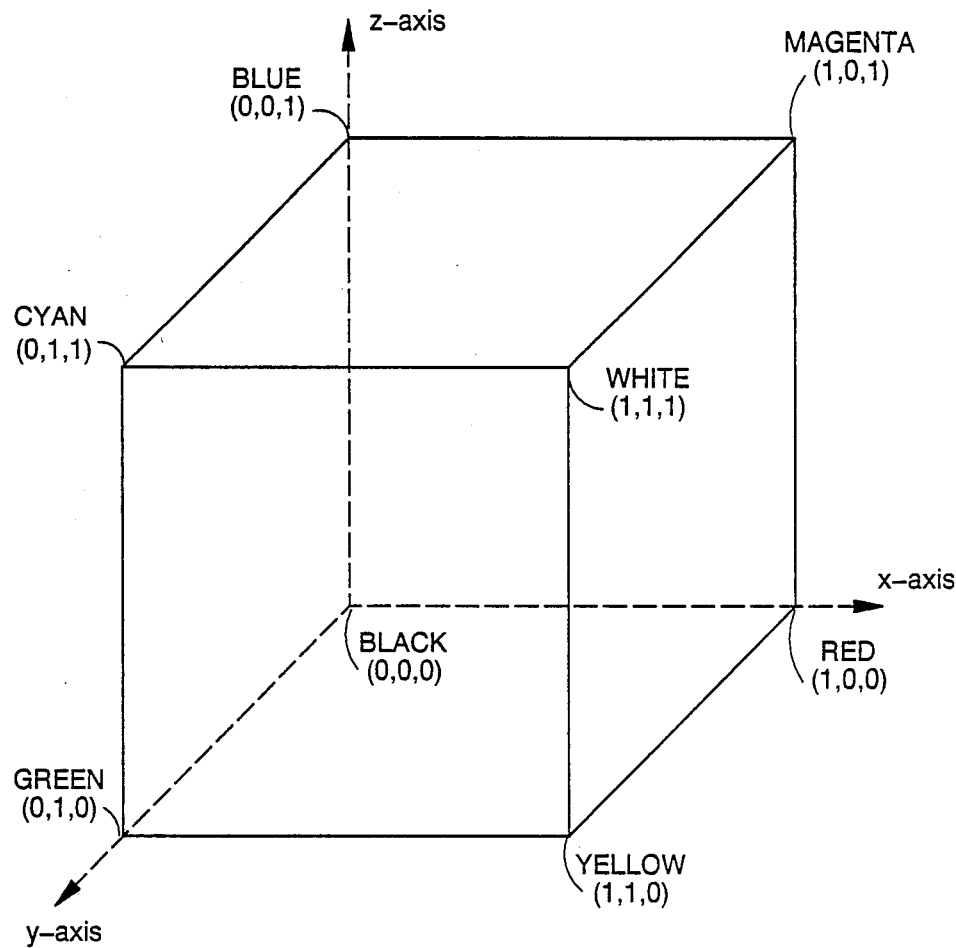
FIG. 1 is a RGB (red, green blue) system for transforming scalar data into continuous color displays.

As an aid in understanding the present invention, the following discussion is provided. Producing continuous color displays of data requires a transformation color coordinate system. Conventionally, such color coordinate systems have either been RGB (red, green, blue), as seen in FIG. 1, or variations of HSL (hue, saturation, lightness). RGB and HSL color transformations have been effectively employed to produce color displays of scalar data (e.g., positive values only) and nonscalar data in which the most negative values have been shifted to assume zero value.

However, a need exists to provide continuous color displays of nonscalar data, such as seismic traces which represent the earth's response to imparted seismic energy and which have complex sinusoidal variations. In order to maximize the amount of information which can be extracted from seismic traces, knowledge of both positive and negative characteristics of such seismic traces is highly desirable for interpreting the earth's subterranean formations. Unfortunately, typical continuous color displays of seismic data generally represent only the positive characteristics of the seismic trace. Such approach tends to alias the interpretation of the seismic trace when only positive values are depicted and, moreover, provides no basis for combining and uniquely displaying two or more separate sets of seismic data on a single display.

Figure 2:
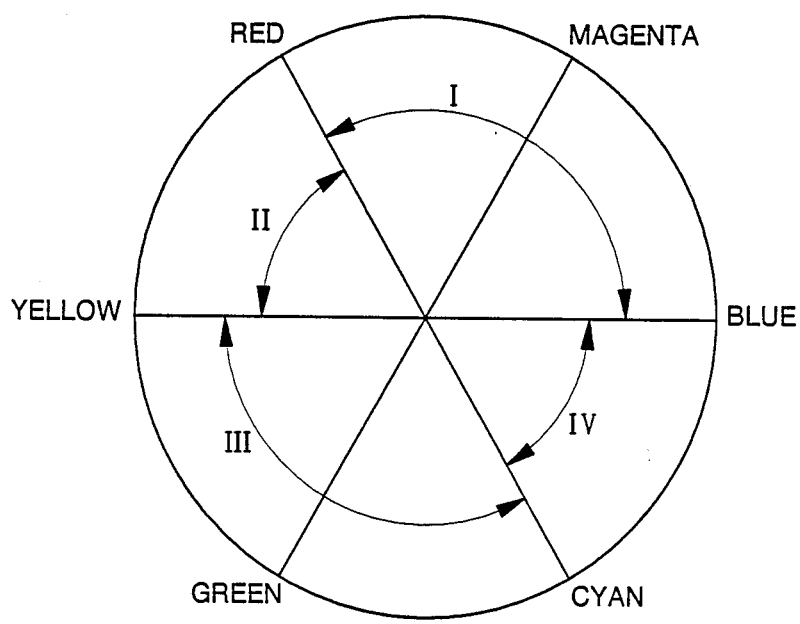
FIG. 2 is a color wheel depicting a geometric relation of primary colors and secondary colors.

Looking now to FIG. 2, a color wheel is depicted having selected primary hues (red, green, blue) and secondary hues (cyan, magenta, yellow). Those skilled in the art will appreciate that hue changes in a continuous fashion around the color wheel and that the indicated primary and secondary hues are merely exemplary of hues at selected locations. In fact, color schemes have been developed for use with computer-generated images whereby continuous changes in hue can be produced. As can be seen on the color wheel, each hue (or color) has a complementary hue associated with it. That is, for a selected hue on the color wheel there exists a hue 180° from the selected hue which is defined as the complement of the selected hue. For example, the complementary hue for red is cyan; for magenta, the complementary hue is green and so on. Moreover, complementary colors can be defined as being colors of opposing ends of diameters of the color wheel of FIG. 2 with the intensity or saturation of each color increasing radially outward from the center of the color wheel. Alternatively, complementary colors can be defined as being colors at opposing ends of the body-diagonals or face-diagonals of the RGB color cube of FIG. 1.

In a first embodiment for uniquely transforming nonscalar data into continuous color mappings, a color coordinate system can be constructed comprising one or more color axes which can be thought of as diameters of a color wheel as shown in FIG. 2. In such first embodiment, each color axis can have a unique spectrum of colors corresponding to positive and negative values of the nonscalar data. Each color axis of the first embodiment can have a unique color selected from the spectrum of colors corresponding to positive values of the nonscalar data and a unique color complementary thereto corresponding to negative values of the nonscalar data. More particularly, the saturation of the color selected for each color axis can vary from zero at the origin to a maximum saturation so as to correspond to variations in the magnitude of the nonscalar data.

In a second embodiment for a uniquely transforming nonscalar data into continuous color displays, a color coordinate system can be constructed comprising one or more color axes which can be thought of as either face-diagonals or body-diagonals of the RGB color cube. In such second embodiment, each color axis can have a unique spectrum of colors corresponding to positive and negative values of the nonscalar data. Each color axis of the second embodiment can have a unique color selected from the spectrum of colors corresponding to positive values of the nonscalar data and a unique color complementary thereto corresponding to negative values of the nonscalar data. More particularly, the lightness of the colors selected for each color axis can vary from gray at their zero point (e.g., at the point the face-diagonals or body-diagonals intersect) to a maximum lightness so as to correspond to variations in the magnitude of the nonscalar data.

Figure 3A:
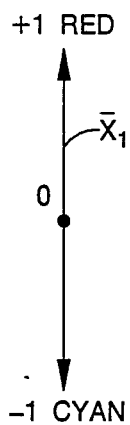
FIG. 3A represents a color system for transforming one-dimensional data sets.

The first embodiment of the invention will now be described in more detail with reference to FIGS. 3-5. In particular, FIG. 3A represents a color coordinate system for transforming one-dimensional nonscalar data into continuous color mappings. Along a first color axis $\overline{x}_1$, positive values of the one-dimensional nonscalar data can be represented by varying saturations or intensities of a first color (e.g., red) and negative values of the one-dimensional nonscalar data can be represented by varying saturations of a color complementary to the first color (e.g., cyan). The origin or zero point along the color axis $\bar{x}_1$ can be defined to be black. Alternatively, those skilled in the art will recognize that the zero point along the color axis $\bar{x}_1$ can also be defined to be either white or gray. The saturations or intensities of the selected colors can be varied to correspond to scaled values of the one-dimensional nonscalar data. Scaling the nonscalar data ensures that the magnitude of the nonscalar data ranges in values from 0 to a maximum (e.g., from $-1$ to 0 and 0 to $+1$) so as to correspond to variations in the saturation of selected colors.

Figure 3B:
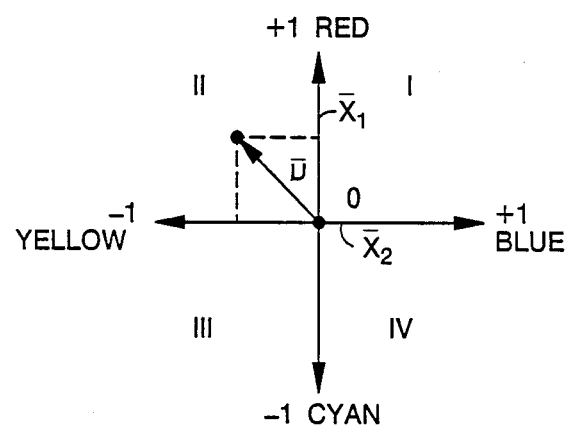
FIG. 3B represents a color system for transforming two separate one-dimensional data sets to produce a single display or a single two-dimensional data set.

FIG. 3B represents a color coordinate system for transforming either two-dimensional nonscalar data or transforming and uniquely combining two sets of one-dimensional nonscalar data on a single display. The first color axis $\bar{x}_1$ of the color coordinate system is assigned a first color (e.g., red) for positive values of a first component of the two-dimensional nonscalar data or positive values of the first of the two one-dimensional nonscalar data sets. While a color (e.g., cyan) complementary to the first color is assigned for negative values of the first component of the two-dimensional nonscalar data or negative values of the first of the two one-dimensional data sets. The second color axis $\bar{x}_2$ of the color coordinate system is assigned a second color (e.g., blue) for positive values of a second component of the two-dimensional nonscalar data or positive values of the second of the two one-dimensional nonscalar data sets. While a color (e.g., yellow) complementary to the second color is assigned for negative values of the second component of the two-dimensional nonscalar data or negative values of the second of the two one-dimensional nonscalar data sets. The positive and negative values of the two-dimensional nonscalar data and the two one-dimensional nonscalar data sets are scaled with a scaling factor so that the magnitudes of the nonscalar data values range from zero to a maximum (e.g., from $-1$ to 0 or 0 to $+1$) so as to correspond to variations in saturations of the selected colors.

Having thus established such a two-dimensional color coordinate system, those skilled in the art will recognize that vector $\bar{U}=a\bar{x}_1+b\bar{x}_2$ (shown on FIG. 3B) can be represented by a unique color which is the result of chromatic vector addition of a first color (having a selected intensity or saturation corresponding to a scaled value of a first component of the nonscalar data) along the color axis $\bar{x}_1$ and a second color (having a selected intensity or saturation corresponding to a scaled value of a second component of the nonscalar data) along the color axis $\bar{x}_2$. With reference to FIG. 2, it can be seen that values of the vector $\bar{U}$ in quadrant I of FIG. 3B can be represented by a continuous spectrum and intensity of colors from red to blue. Similarly, values of the vector $\bar{U}$ in any quadrant of FIG. 3B can be represented by a continuous spectrum and intensity of colors. As such, the first embodiment provides a novel method for uniquely displaying both one- and two-dimensional nonscalar data sets as well as a method for combining two sets of one-dimensional nonscalar data by chromatic vector addition and producing a unique color display of the combined sets of nonscalar data.

Thus, in the first embodiment, nonscalar data can be transformed to a continuous color display according to:

$$\bar{U}=a\bar{x}_1=b\bar{x}_2 \quad (2)$$

where:
$\bar{U}=$ a unique color representation of the nonscalar data;
$a=$ a scaled value of a first component of the nonscalar data;
$b=$ a scaled value of a second component of the nonscalar data;
$\bar{x}_1$ and $\bar{x}_2$ represent separate color axes of a two-dimensional color coordinate system.

The values of a and b can determine the saturation of a color along each color axis of the color coordinate system as shown in FIG. 3B. The transformation of Equation 2 for two-dimensional nonscalar data can also be represented by:

$$\bar{U}=R \sin \theta \quad (3)$$

where
$R=(a^2+b^2)^{\frac{1}{2}}$; and
$\theta=\arcsin a/(a^2+b^2)^{\frac{1}{2}}$.

As such, the angle $\theta$ defines a unique color in the color coordinate systems and $(a^2+b^2)^{\frac{1}{2}}$ defines the saturation of the resulting color.

The color transformation of Equation (3) can be further simplified in practice whereby the angle $\theta$ is determined from the scaled values of the nonscalar data to determine the correct color, but variations in the saturation of the resulting color according to the magnitude of R can be optional. In fact, in FIG. 6C, the resulting colors correspond to angles about the color coordinate system of FIG. 3B, as shown by the color table therein.

In the second embodiment, one-dimensional nonscalar data can also be uniquely displayed employing a color coordinate system where the color axes can be thought of as either face-diagonals or body-diagonals of a RGB color cube. Similarly, two-dimensional nonscalar data can be uniquely displayed employing such a color coordinate system wherein the color axes can be intersecting pairs of either face-diagonals or body-diagonals of a RGB color cube. Further, three- or four-dimensional nonscalar data can be uniquely displayed employing a color coordinate system wherein the color axes can be body-diagonals of a RGB color cube.

In color coordinate systems of the second embodiment, values of the nonscalar data along each of the selected color axes can be represented by a continuous spectrum of colors and intensities wherein the spectrum of colors selected for the positive values along each color axes are complementary to the colors selected for negative values along the corresponding color axes. A chromatic vector $\bar{U}$ in the three-dimensional color coordinate system can be represented by a unique spectrum of colors that depend upon in which octant the vector $\bar{U}$ is located, as well as its magnitude. By chromatic vector addition, the vector $\bar{U}$ can be described as:

$$\bar{U}=a\bar{x}_1+b\bar{x}_2+c\bar{x}_3 \quad (4)$$

where:
$\bar{x}_1=$ a first color axis of a three-dimensional color coordinate system
$\bar{x}_2=$ a second color axis of a three-dimensional color coordinate system
$\bar{x}_3=$ a third color axis of a three-dimensional color coordinate system a = scaled values of a first nonscalar data along $\bar{x}_1$
b = scaled values of a second component of the nonscalar data along $\bar{x}_2$
c = scaled values of a third component of the nonscalar data along $\bar{x}_3$ FIG. 4 is a conventional wiggle trace display of seismic data. In fact, the seismic data of FIG. 4 represents the earth's response to seismic energy imparted with a seismic source having a vertical line of action (e.g., a compressional (p) wave vibrator) as recorded by geophones having vertical lines of action (e.g., a compressional (P) wave geophone). Such seismic data is commonly referred to as compressional (P) seismic data.

Figure 4:
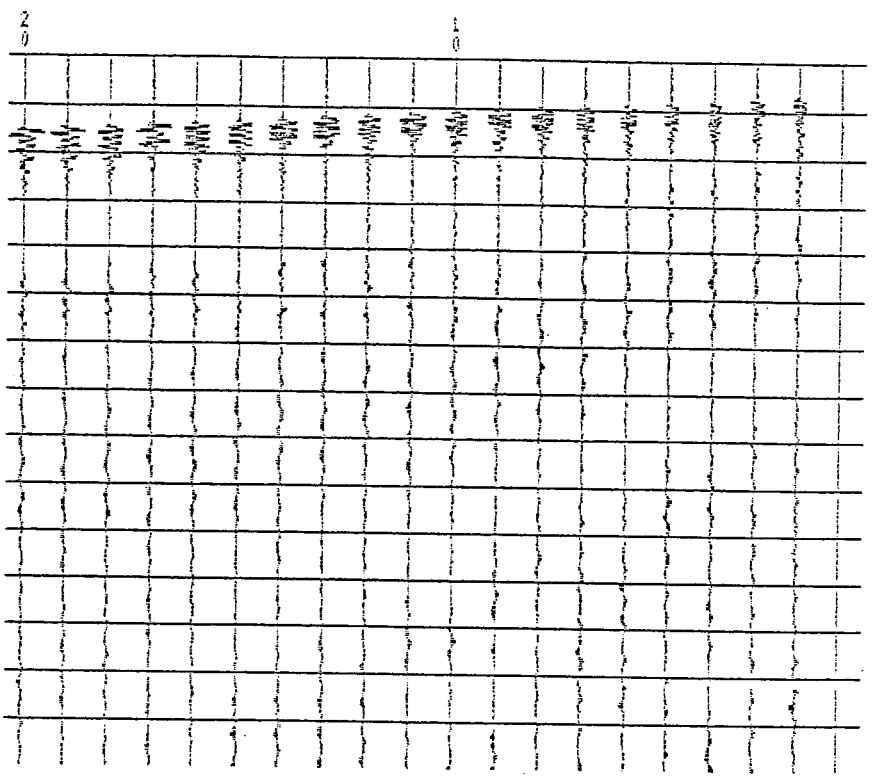
FIG. 4 is a conventional display of compressional seismic data.
Figure 5A:
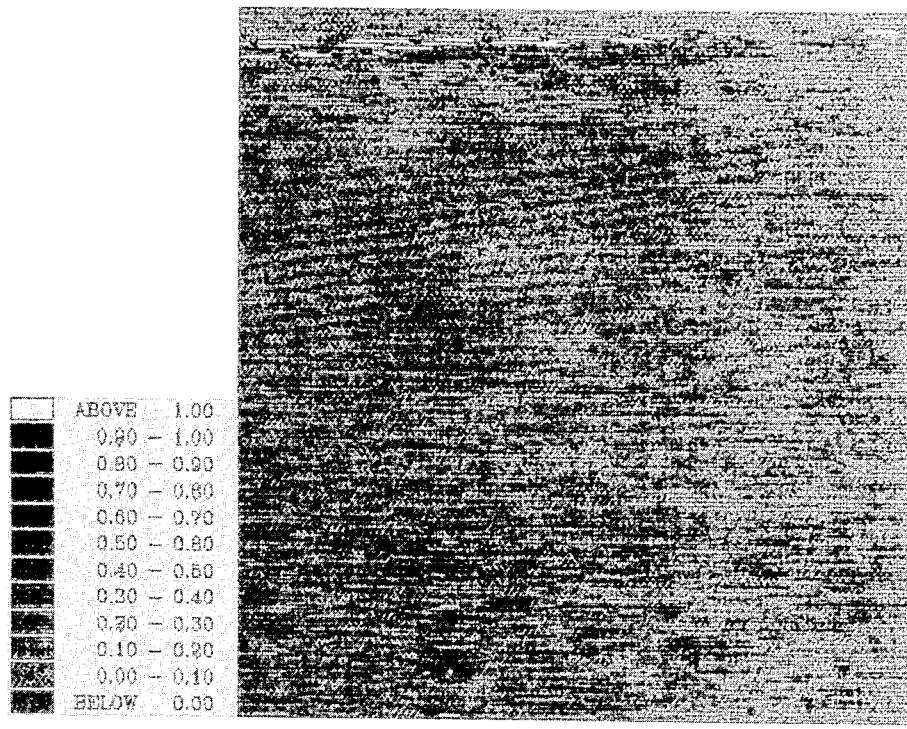
FIG. 5A is a color display of the compressional (P) seismic data from FIG. 4 wherein a color is assigned only to the positive values of the compressional seismic data.
Figure 5B:
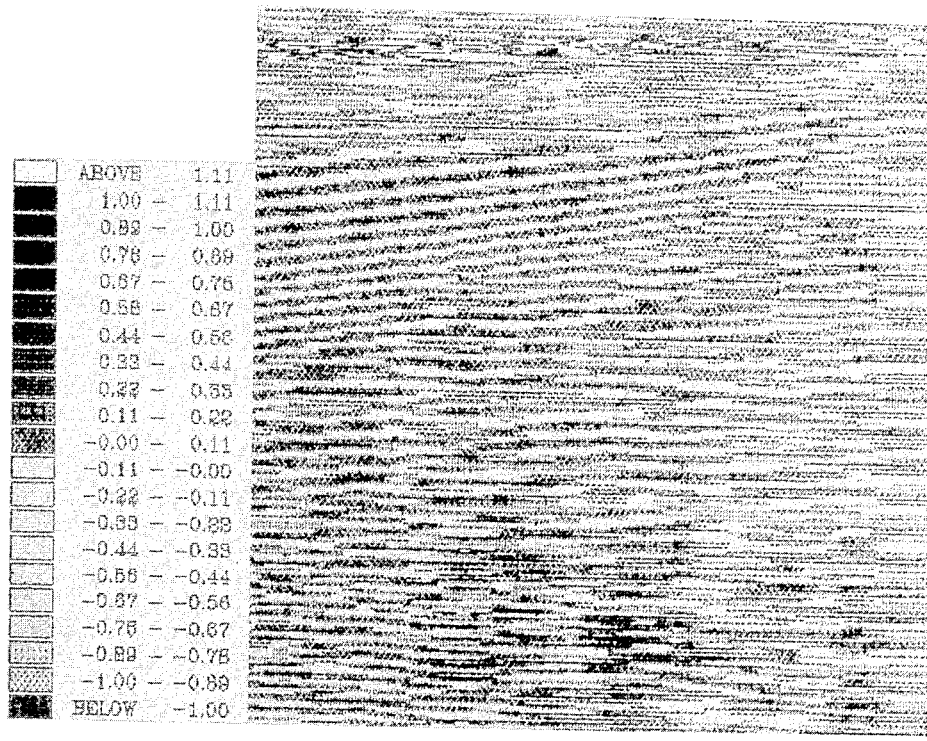
FIG. 5B is a color display of the one-dimensional data set of FIG. 4 wherein colors are assigned to both negative and positive values of the data.

Looking now to FIG. 5A, the seismic data of FIG. 4 are depicted in a conventional color scheme. Here, positive values of the amplitude at selected times along each seismic trace have been assigned a varying saturation of the color red, whereby the range of saturation is from zero to a maximum (e.g., from 0 to +1). FIG. 5B represents the same seismic data as depicted in FIG. 5A; however, the one-dimensional color coordinate system of FIG. 3A has been employed so that varying saturations of red are assigned to positive values of amplitude, and varying saturations of the complementary color cyan are assigned to negative values of amplitude.

Figure 6A:
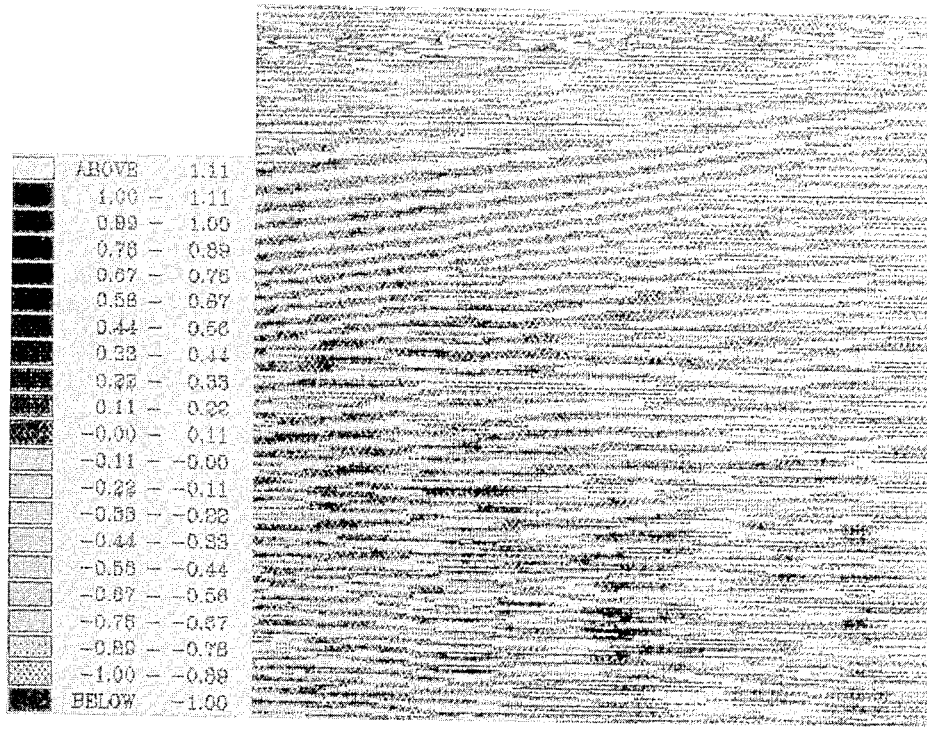
FIGS. 6A and 6B are color displays of two one-dimensional nonscalar data sets wherein colors are assigned to both positive and negative values of the two one-dimensional nonscalar data sets.
Figure 6B:
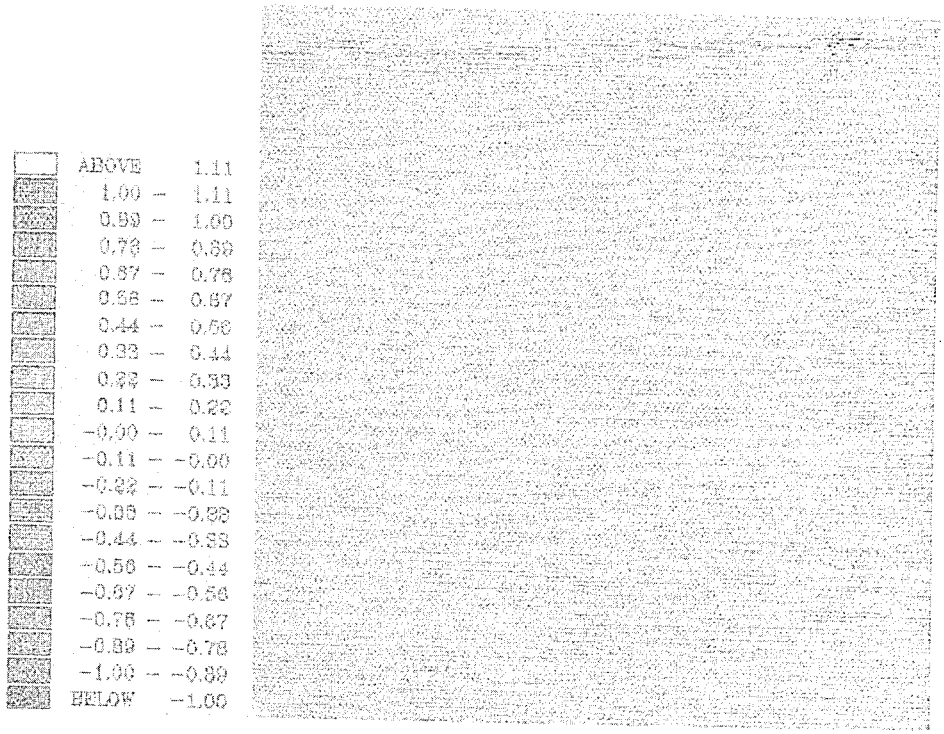
Figure 6C:
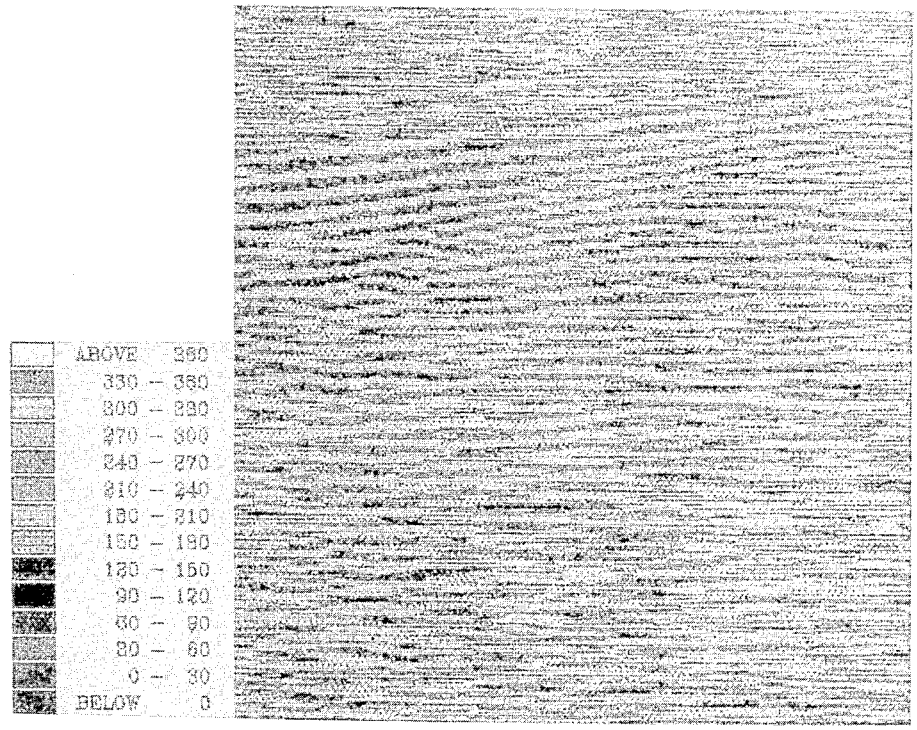
FIG. 6C is a color display resulting from the chromatic vector addition combination of the two one-dimensional nonscalar data sets of FIGS. 6A and 6B.

Looking now to FIGS. 6A and 6B, two separate seismic sections from the same locale are shown according to the first embodiment of the invention. FIG. 6A comprises seismic traces obtained using conventional compressional (P) acquisition as described previously wherein colors have been assigned to positive and negative amplitude values according to a first color axis $\bar{x}_1$ of FIG. 3B. FIG. 6B comprises seismic traces using the shear (SH) acquisition technique wherein colors have been assigned to positive and negative amplitude values according to a second color axis $\bar{x}_2$ of FIG. 3B. As used herein, shear (SH) seismic data is obtained employing a seismic source having a vertical line of action and recording the earth's response to the energy imparted into the earth by such seismic source with geophones having horizontal lines of action transverse to a line of survey (SH). FIG. 6C represents the combined seismic data from FIGS. 6A and 6B employing the two-dimensional color transformation of FIG. 3B. The combination of the two sets of seismic data has been achieved by a chromatic vector addition; however, those skilled in the art will appreciate that combinations of the two sets of seismic data can also include chromatic vector subtraction.

Figure 7A:
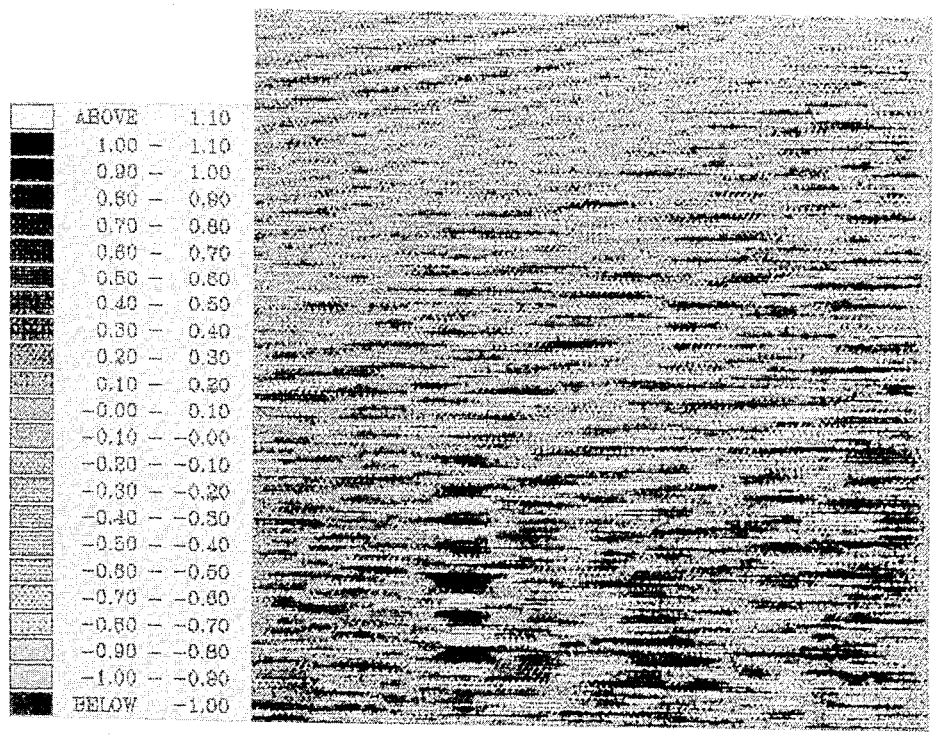
FIGS. 7A, 7B and 7C are color displays of three separate one-dimensional data sets wherein colors are assigned to the positive and negative values of the three one-dimensional data sets.
Figure 7B:
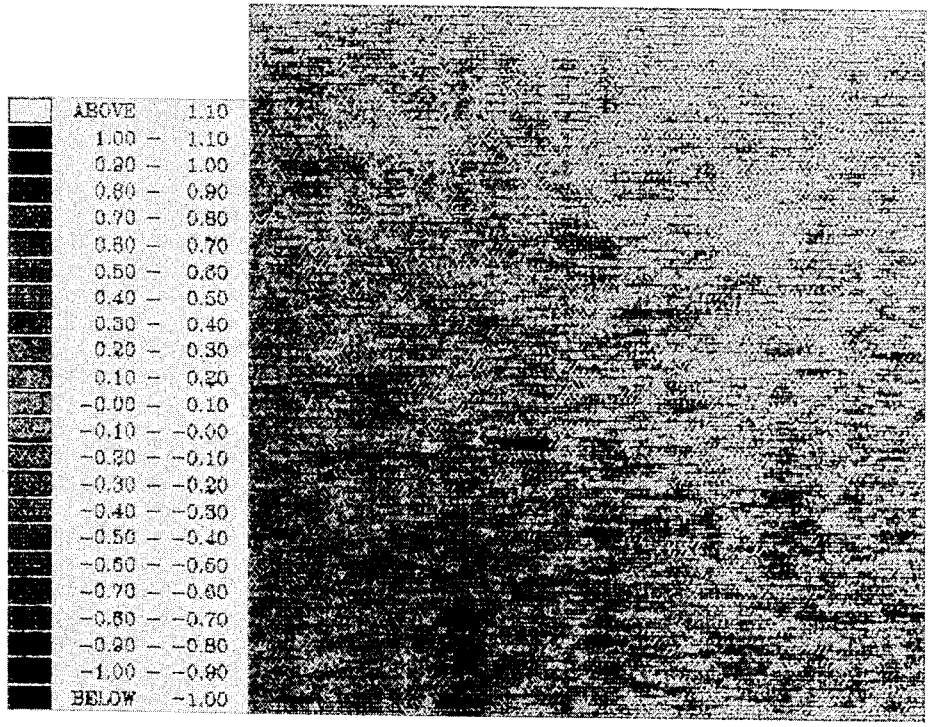
Figure 7C:
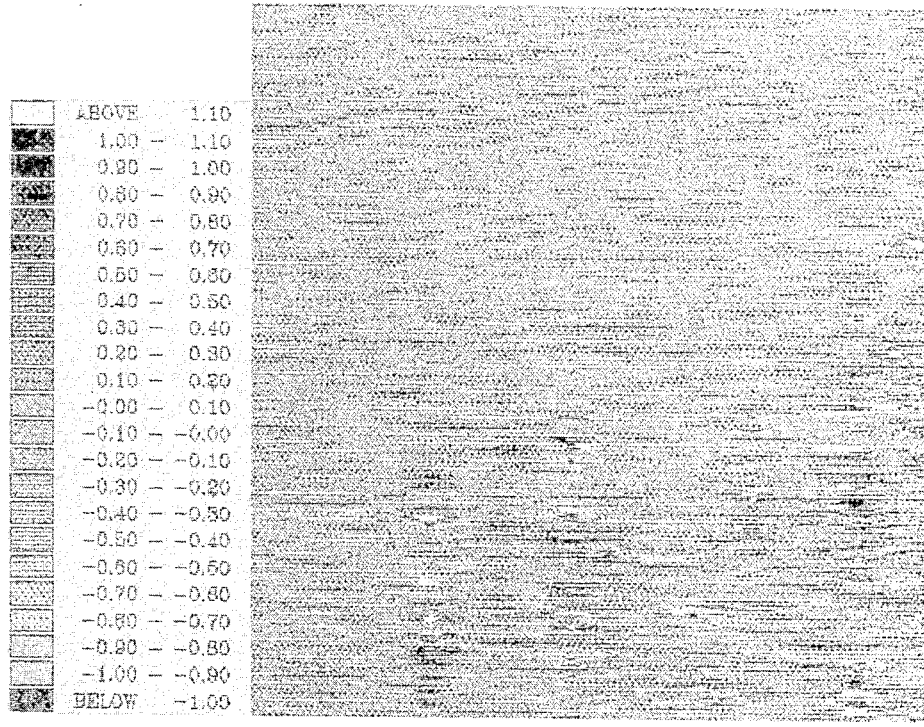
Figure 7D:
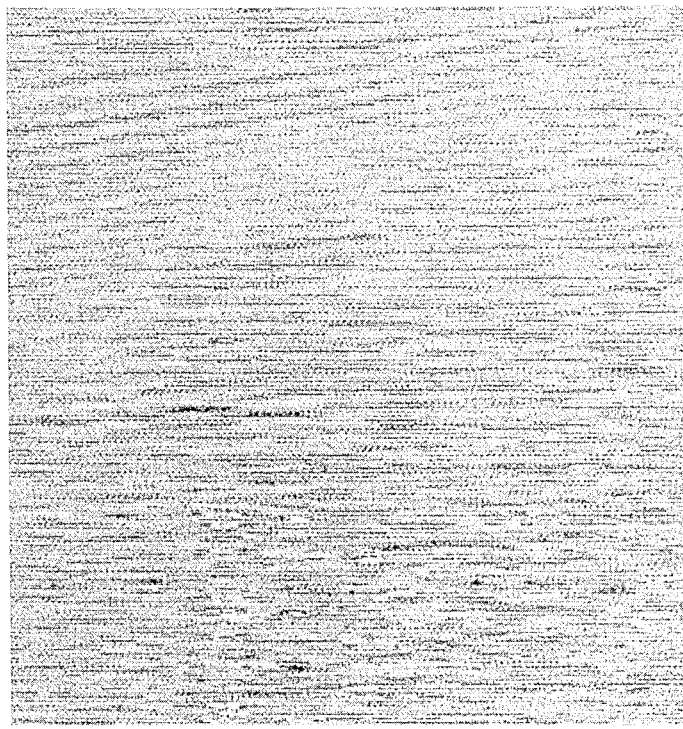
FIG. 7D is a single color display resulting from the chromatic vector addition of the tree one-dimensional data sets of FIGS. 7A, 7B and 7C wherein colors are assigned to both the negative and positive values of the three one-dimensional data sets.

Looking now to FIGS. 7A, 7B and 7C, three separate sets of seismic data from the same locale are displayed as continuous coloring mappings according to the second embodiment of the invention. FIG. 7A comprises seismic traces obtained using the compressional (P) acquisition technique wherein a first spectrum of colors has been assigned to positive and negative amplitude values according to a first color axis $\bar{x}_1$ of a three-component color coordinate system. In particular, the first color axis $\bar{x}_1$ is the red-cyan body-diagonal of the RGB color cube. FIG. 7B comprises seismic traces obtained using the shear (SH) acquisition technique wherein a second spectrum of colors has been assigned to positive and negative amplitude values according to a second color axis $\bar{x}_2$ of a three-component color coordinate system. In particular, the second color axis $\bar{x}_2$ is the green-magenta body-diagonal of the RGB color cube. FIG. 7C comprises seismic traces obtained using the shear (SV) acquisition technique wherein a third spectrum of colors has been assigned positive and negative amplitude values according to a third color axis $\bar{x}_3$ of a three-component color coordinate system. In particular, the third color axis $\bar{x}_3$ is the blue-yellow body-diagonal of the RGB color cube. As used herein, the shear (SV) acquisition technique comprises imparting seismic energy into the earth with a seismic source having a vertical line of action (P) and recording the earth's response thereto with a geophone having a horizontal line of action (SH) aligned with the survey lie. FIG. 7D represents the combined seismic data from FIGS. 7A, 7B and 7C using the color coordinate system of the second embodiment wherein the three sets of seismic data have been combined by chromatic vector addition to produce a unique color display of the combined seismic data. The combination of the seismic data has been achieved by chromatic vector addition; however, those skilled in the art will appreciate that combinations of the seismic data can also include chromatic vector subtraction.

Figure 8:
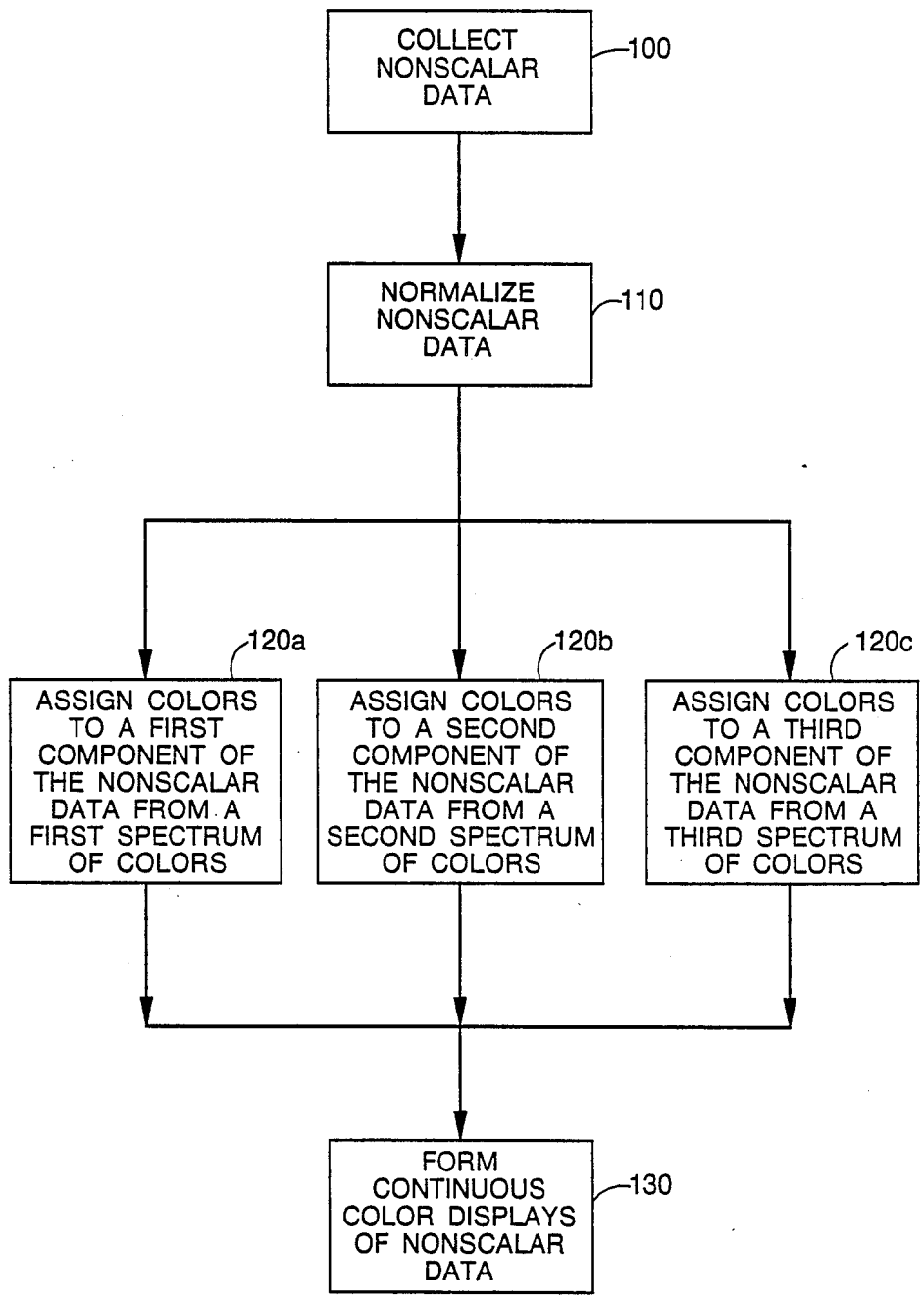
FIG. 8 is a flow diagram of the present invention.

A more detailed description of the method for producing continuous color displays of nonscalar data is now provided. To aid in this discussion, a flow diagram of the present invention is provided with FIG. 8. The nonscalar data which is to be mapped as continuous color displays are collected at 100. The nonscalar data are then normalized at 110, such that the magnitude of the nonscalar data ranges in value from a minimum of zero to a maximum (e.g., from 0 to ±1). Such normalization can be global whereby the maximum value of any component of the nonscalar data is employed to normalize the entire non-scalar data set. This approach assures that relative measures of the nonscalar data are preserved. Alternatively, such normalization can include nonlinear scaling whereby each separate component of the nonscalar data is scaled. Such an approach can be especially useful when producing continuous color displays from seismic data sets in which differences in maximum values for each component can be large.

At steps 120a, b, and c, each component of the nonscalar data is assigned colors from a unique spectrum of colors along color axes of a color coordinate system. In particular, colors can be assigned to values of each component of either one- or two-dimensional nonscalar data according to the first embodiment wherein each color axis can be defined as having unique pairs of complementary colors and values of the scaled nonscalar data along each color axis are transformed according to saturation or intensity of the corresponding color. Alternatively, colors can be assigned to each component of either one- or two-dimensional nonscalar data according to the second embodiment wherein color axes can be defined having unique color spectrums represented by face-diagonals of the RGB color cube. For two-dimensional nonscalar data and for combining two one-dimensional nonscalar datasets, the color axes are preferably selected from intersecting face diagonals of the RGB color cube. Additionally, colors can be assigned to each component of either one-, two- or three-dimensional nonscalar data or for combining non-scalar datasets according to the second embodiment wherein the color axes can be assigned unique color spectrums represented by body-diagonals of the RGB color cube.

At step 130, continuous color displays of the transform multicomponent nonscalar data can be produced. Such continuous color displays can represent each component of the multicomponent nonscalar data separately or the multicomponent nonscalar can be combined by chromatic vector addition to produce a composite continuous color display of the multicomponent nonscalar data.

A novel method for producing continuous color displays of nonscalar data has been described which overcomes the limitations of displaying multicomponent nonscalar data. Although selected colors have been employed to demonstrate the process of the present invention, those skilled in the art will appreciate that any color and its complement can be employed for each color axis of the color coordinate system. While the continuous color displays provided herein were produced on an IBM Color Jet printer, those skilled in the art will appreciate that such continuous color displays can also advantageously be displayed on a color monitor of a computing system. Additionally, combinations of the seismic data provided herein have been shown as the result of chromatic vector addition; however, those skilled in the art will appreciate that combinations of seismic data can be achieved through chromatic vector subtraction. Other modifications and variations of the color coordinate system described are nevertheless contemplated to fall within the scope of the claims provided.

I claim:

1. A method for continuous color mapping of geophysical data having positive and negative values, comprising the steps of:
   (a) creating a color coordinate system having at least two color axes;
   (b) assigning a first spectrum of colors to a first color axis, whereby colors selected from the first spectrum of colors corresponding to positive values of a first component of the data are complementary to colors selected from the first spectrum of colors corresponding to negative values of the first component of the data; and
   (c) assigning a second spectrum of colors to a second color axis, whereby colors selected from the second spectrum of colors corresponding to positive values of a second component of the data are complementary to colors selected from the second spectrum of colors corresponding to negative values of the second component of the data.

2. The method of claim 1 further including the step of:
   mapping the first component of the data onto a color display with the first color axis of the color coordinate system.

3. The method of claim 1 further including the step of:
   mapping the second component of the the data onto a color display with the second color axis of the color coordinate system.

4. The method of claim 1, further including the step of:
   assigning a third spectrum of colors to a third color axis, whereby colors selected from the third spectrum of colors corresponding to positive values of a third component of the data are complementary to colors selected from the third spectrum of colors corresponding to negative values of the third component of the data.

5. The method of claim 4 further including the step of:
   mapping the third component of the data onto a color display with the third color axis of the color coordinate system.

6. The method of claim 1 further including the step of:
   mapping a combination of the first and second components of the data onto a unique color display by chromatic vector addition with the first and second color axes of the color coordinate system.

7. The method of claim 4 further including the step of:
   mapping a combination of the first, second and third components of the data onto a unique color display by chromatic vector addition, with the first, second and third color axes of the color coordinate system.

8. The method of claim 1 wherein the colors from the first and second spectrums of color for the first and second color axes correspond to first and second diameters of the color wheel in FIG. 3b.

9. The method of claim 1 wherein the colors selected from the first and second spectrum of colors for the first and second color axes correspond to first and second face-diagonals of a RGB color cube.

10. The method of claim 4 whereby the colors selected from the first, second and third spectrum of colors for the first, second, and third color axes correspond to body-diagonals of a RGB color cube.

11. A method for producing continuous color displays of at least two separate sets of seismic data comprising the steps of:
   (a) creating a color coordinate system having at least two color axes, wherein each color axis of the color coordinate system has a unique spectrum of colors for both positive and negative values along each color axis and the colors assigned to positive values along each color axis are complementary to the colors assigned to negative values along each axis .
   (b) assigning unique colors to each component of the seismic data according to one of the color axes of the color coordinate system; and
   (c) forming continuous color displays of the seismic data by chromatic vector addition of the assigned colors.

12. The method of claim 11 wherein the spectrum of colors for each color axis comprises a first color and a color complementary to the first color both having varying intensities ranging from zero to a maximum.

13. The method of claim 11 wherein the spectrum of color for each color axis comprises a first spectrum of colors and a spectrum of colors complementary to the first spectrum of colors having colors varying according to face-diagonals of a Red, Green, Blue color cube.

14. The method of claim 11 wherein the spectrum of colors for each color axis comprises a first spectrum of colors complementary to the first spectrum of colors having colors varying according to body-diagonals of a Red, Green, Blue color cube.

15. A method for combining two or more separate sets of geophysical data having positive and negative values, comprising the steps of:
   (a) creating a color coordinate system having at least two color axes, wherein each color axis has a corresponding spectrum of colors and colors selected from each spectrum of colors for positive values along each color axis are complementary to colors selected from each spectrum of colors for negative values along each color axis;
   (b) mapping a first set of geophysical data according to a first color axis of the color coordinate system;
   (c) mapping a second set of geophysical data according to a second color axis of the color coordinate system; and
   (d) combining the first and second mappings of the geophysical data by chromatic vector addition.

* * * * *

UNITED STATES PATENT AND TRADEMARK OFFICE
CERTIFICATE OF CORRECTION

PATENT NO. : 4,843,599

DATED : June 27, 1989

INVENTOR(S) : Rhoda H. Bucker

It is certified that error appears in the above—identified patent and that said Letters Patent is hereby corrected as shown below:

Column 7, line 1, after "first", and before "nonscalar", insert --component of the--.

Claim 8, Column 10, line 15, "FIG. 3b" should read --FIG. 1b--.

Signed and Sealed this

Seventh Day of August, 1990

*Attest:*

HARRY F. MANBECK, JR.

*Attesting Officer*      *Commissioner of Patents and Trademarks*